Figure 1:
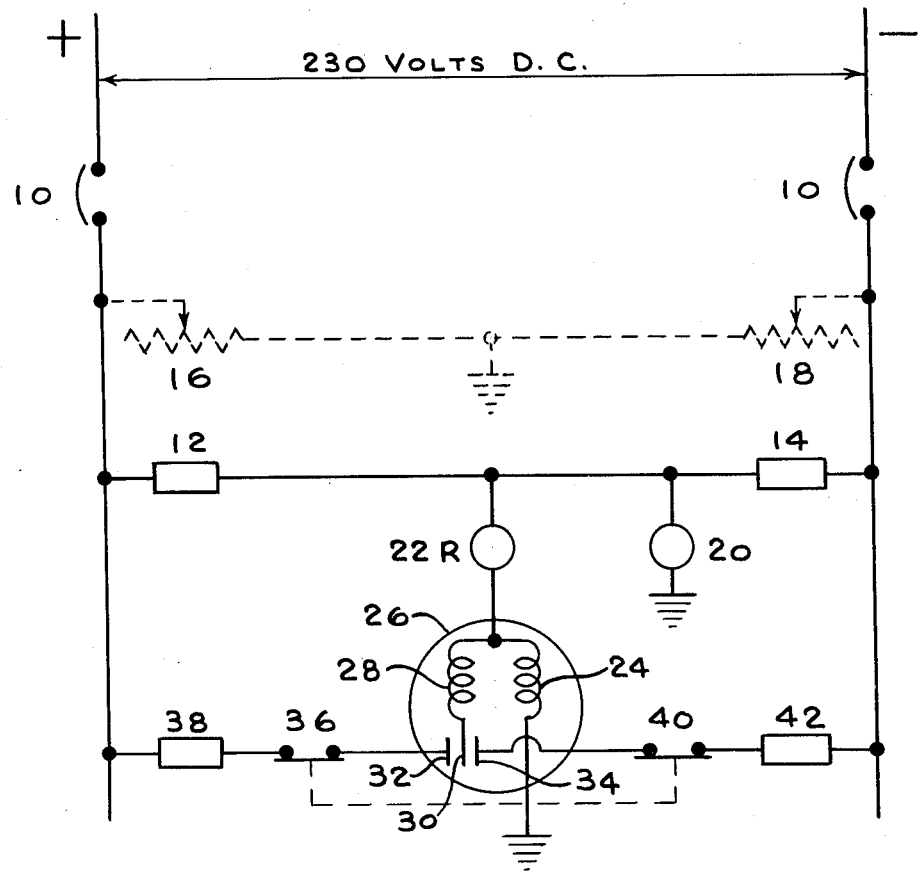

INVENTORS
DOUGLAS W. FATH
BY CHARLES E. SMITH

ATTORNEY

2,989,694
FAULT DETECTOR
Douglas W. Fath, Brookfield, and Charles E. Smith, Milwaukee, Wis., assignors to Cutler-Hammer, Inc., Milwaukee, Wis., a corporation of Delaware
Filed Mar. 17, 1958, Ser. No. 721,719
2 Claims. (Cl. 324—51)

This invention relates to improvements in ground detectors for power lines.

In many instances it is considered advantageous to have the power lines for D.C. motors and the like ungrounded or floating. Thus, if there is a breakdown in the insulation of one of the lines, the motor and magnetic brakes will still operate. This would not be true, if the system were grounded. However, to take safe advantage of such a floating system, it is advisable to be able to ascertain the seriousness of any fault and the location of it. In the past this has been accomplished only by constant surveillance.

It is an object of this invention, therefore, to provide a ground detector for a floating power system which will continually provide indication of the amount and location of any breakdown in the insulation of a line of the system and give a warning signal when the amount of such breakdown is serious enough to require investigation and a decision as to the continuation of operation.

A still further object of this invention is to provide a ground detector for such purposes which is safer and more dependable than those previously available, is simple, relatively inexpensive, and easy to install.

These objects are obtained by using both a continuously indicating differential voltmeter and a relay circuit controlled by a differential contact making voltmeter. Both of these are connected between ground and the center tap between two resistances in series across the line. The blade of the contact making voltmeter swings between contacts connected to each line and upon engagement places the relay coil circuit across both lines to energize it. When the resistance values of the insulation of each line are equal, the potential from ground through each of said resistances to each line will be equal and opposite and the voltmeters will be in zero position. As the resistance value of the insulation of a line lowers (because of a partial or complete ground) the potential from ground through one of said resistances to such line increases with respect to that from ground through the other resistance to the other line and both voltmeters measure such differential voltage. The amount of differential voltage and the faulty line are both indicated continuously by the indicating voltmeter. The contact making voltmeter is adjusted so that contact is made when such differential is of sufficient value to require an investigation. The making of this contact energizes the relay circuit to ring a bell or other alarm. Attention is thus directed to a fault which may or may not require immediate correction. Readings of the continuously indicating voltmeter can then and thereafter be used in determining whether to shut down operations before a cycle of work is completed or to continue operation to the end of such cycle. By using continuous observation, a number of such work cycles may be completed before shutdown is necessary.

Figure 2:
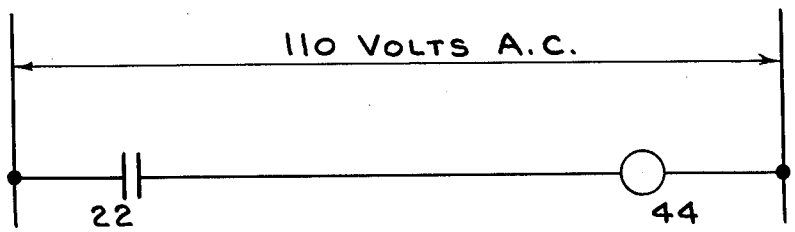

A specific embodiment of a ground detector is schematically shown in the accompanying drawing, in which:

FIG. 1 is a wiring diagram of a ground detector embodying the invention applied to the lines of a source of 230 volts D.C.; and FIG. 2 is a wiring diagram of a 110 volt power circuit embodying an annunciator relay and control contact operated by the ground detector.

In the specific embodiment shown and described a source of 230 volts D.C., furnished by a constant voltage exciter, energizes ungrounded or floating positive and negative power lines through circuit breakers 10 for protecting the ground detector circuit. A pair of equal resistances 12 and 14 are connected in series across such positive and negative lines. Shown by broken line, because it represents an unseen inherent part of the circuit, are a pair of variable resistors 16 and 18 also connected in series across the positive and negative lines. The variable resistances 16 and 18 represent the resistance value of the insulation covering such positive and negative lines. They are shown as variable to illustrate that this resistance value may break down partially or completely to create a partial or complete ground of one or other of the lines. The neutral point between variable resistances when of equal value is connected to ground to illustrate the actual unseen condition. The resistances 12 and 14 and 16 and 18 are thus connected in parallel and constitute a Wheatstone bridge so that, if one of the variable resistances 16 and 18 drops in value, a potential is created between the ground at the center tap between resistances 16 and 18 and the center tap between the resistances 12 and 14, and current will flow between such points, if connected. This condition comes into existence, for example, if the insulation covering the negative line should partially or completely fail, exemplified by a lowering or destruction of the variable resistance 18.

Such potential, when so created, is indicated in value and direction by a continuously indicating differential voltmeter 20 connected to the center tap between the resistances 12 and 14 and ground. This voltmeter has a scale with a central zero and records as high as 300 volts to either the negative or positive side of such scale. When a potential comes into existence as above described, the pointer will move toward the negative side of the scale and show the value of such potential and indicate the negative line. This value can be used to determine the seriousness of the ground (or leakage) and can be continually examined for determining the continued operation of the system.

Also connected to the central tap between the resistances 12 and 14 is a relay circuit including in series to ground a coil 22R of a relay and a fixed coil 24 of a contact making voltmeter 26. The contact making voltmeter 26 has a movable auxiliary coil 28 carrying a blade 30 which swings between two adjustable contacts 32 and 34. The contact 32 is connected to the positive line through a reset button contact 36 and a fixed resistance 38. The contact 34 is connected to the negative line through reset button 40 and a fixed resistance 42. The purpose of these resistances is to limit the current in the ground detector relay and contact making voltmeter. The reset buttons 36 and 40 are mechanically connected so as to operate in unison.

When a potential is created in the manner described, the blade 30 of the contact making voltmeter will be drawn toward the contact 34. This contact (and the other) is adjusted so that the blade will engage the contact when a differential voltage of, say 100 volts occurs. This value is variable depending upon the characteristics of the system to be protected. It is sufficient for the purposes of understanding this invention to know that this value is set so that a warning signal will be given when the differential voltage is serious enough to require prompt investigation and determination as to continuation of the operation of the system. When the blade 30 engages contact 34, the ground detector relay circuit is energized and the relay coil 22R will be energized across the line and close a normally open contact 22 in the A.C. alarm circuit shown in FIG. 2.

The circuit shown in FIG. 2 is connected to a source of power of 110 volts A.C. and consists of a normally open relay contact 22 in series with the relay coil 44 of an annunciator. When the contact 22 is closed, the relay 44 is energized and a bell (not shown) commences to ring and will continue to ring until the relay 22R is removed from circuit by the opening of the reset contact buttons 36 and 40 and manually (in some cases) unlatching such relay.

When a sensible signal is so received, the differential voltage at the continuously indicating differential voltmeter 20 may be continually observed and a decision reached as to whether the differential so observed is sufficiently dangerous to stop the operation of the system. By continually observing this voltmeter, the defective system may still be employed to complete a work cycle. In one application, for example, it is thus possible to move a skip car or the like to the end of its planned travel before closing down the defective system and repairing the damaged line. In such an application the voltage of the floating system is applied to the shunt field of a skip hoist motor. Thus such system is protected and yet it is permitted to complete an operation of the motor and avoid a stoppage of the skip car in a dangerous position.

We claim:

1. In a system for detecting and retaining indication in which two lines of a floating electrical power supply a ground condition has occurred, the combination comprising two equal resistors connected in series across the two power supply lines, a contact making voltmeter having a pair of stationary contacts which are connected to respective ones of said power supply lines, a movable contact, a main operating coil connected to the point common between said resistors and ground for energization in accordance with the direction of leakage current flow therein to close said movable contact with one or the other of said stationary contacts and an auxiliary coil connected between said resistor common point and said movable contact to retain it closed to the stationary contact with which it is engaged upon deenergization of said main coil, and normally closed switch means in the connections between said stationary contacts and the power supply lines and operable to open said connectors to deenergize said auxiliary coil.

2. The combination according to claim 1, together with a relay having its operating coil in circuit between said resistor common point and said main and auxiliary coils of said voltmeter and an annunciator which is activated by energization of said relay.

References Cited in the file of this patent

UNITED STATES PATENTS

| | | |
|---|---|---|
| 1,523,803 | Goodwin | Jan. 20, 1925 |

FOREIGN PATENTS

| | | |
|---|---|---|
| 27,271 | Great Britain | 1905 |
| 187,040 | Great Britain | Oct. 19, 1922 |